G. Shield,
Double-Acting Pump.
N°70,634. Patented Nov. 5, 1867.

Witnesses;
Theo Insche
Wm Trewin

Inventor;
Geo Shield
Per.
Attys.

United States Patent Office.

GEORGE SHIELD, OF CINCINNATI, OHIO.

Letters Patent No. 70,634, dated November 5, 1867.

---

IMPROVEMENT IN PUMPS.

---

The Schedule referred to in these Letters Patent and making part of the same.

---

TO ALL WHOM IT MAY CONCERN:

Be it known that I, GEORGE SHIELD, of Cincinnati, in the county of Hamilton, and State of Ohio, have invented a new and improved Double-Plunger Pump; and I do hereby declare that the following is a full, clear, and exact description thereof, which will enable others skilled in the art to make and use the same, reference being had to the accompanying drawings, forming part of this specification.

This invention relates to a new and improved method of constructing pumps, and the invention consists in forming the pump-barrel in two parts, and in using two plungers, one a solid or closed plunger, and the other a shell or open plunger, as will be hereinafter described.

Similar letters of reference indicate like parts.

Figure 1:
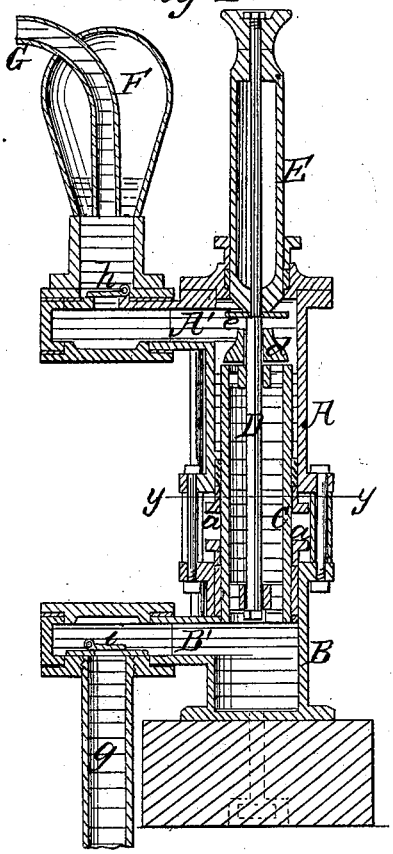
Figure 1 represents a vertical central section of the pump through the line $x\,x$ of fig. 2.
Figure 2:
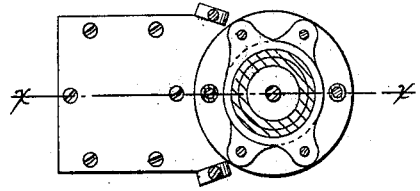
Figure 2 is a horizontal section through the line $y\,y$ of fig. 1.

A is the upper part of the barrel, and B is the lower part. These parts forming the barrel are connected together by bolts, but each part has a stuffing-box, $a\,a$, arranged as seen in the drawing, for the purpose of packing the lower plunger. C represents the lower plunger. This plunger is packed by the stuffing-boxes $a\,a$, as seen. It is open at both ends, but with a valve at the top end, marked $d$. D is the valve-rod. E is the solid or closed plunger. Both plungers are attached to the valve-rod D. Each part of the barrel has a branch, A' and B'. Upon the upper one the air-chamber and the discharge pipe are placed. The air-chamber is marked F, and the discharge pipe is marked G. The water is admitted to the discharge pipe through the valve $h$. To the lower branch is attached the supply pipe $g$. The water is admitted through a valve, $i$, into the pump-barrel B.

When the plungers, which work together, descend, the water passes up through plunger C, raises the valve $d$, and enters the branch A', and is forced by the plunger E through the valve $h$ into the air-chamber, from which it is discharged through the pipe G.

There is a collar, $e$, on the valve-rod, which acts as a stop for the valve $d$ as it rises. The upper plunger is packed by a stuffing-box, $f$, and access is had to the valves in the branches A' B' by plates, which are packed on to the branches and fastened by screws, as seen. The lower plunger C is double the size or area of the upper one, and the quantity of water forced into the air-chamber by the upper plunger is equal to the difference in their areas.

What I claim as new, and desire to secure by Letters Patent, is—

1. The combination and arrangement of the hollow plunger C, valve-rod D, valve $d$, solid or closed plunger E, plate $e$, and stuffing-boxes $a\,a$, as herein described for the purpose specified.

2. The solid or closed plunger E, in combination with the hollow plunger C, valve $d$, and discharge passage A', as herein described for the purpose specified.

3. The double-plunger pump, constructed as described, consisting of the barrel A B, with branches A' B', stuffing-boxes $a\,a$, hollow plunger C, solid or closed plunger E, valve $d$, plate $e$, chamber F, and pipes G $g$, as herein described for the purpose specified.

GEORGE SHIELD.

Witnesses:
C. F. HAUSELMANN,
KASPAR EMMERICH.